United States Patent Office 3,262,897
Patented July 26, 1966

3,262,897
THERMOSETTING RESINS MODIFIED WITH GLYCOLIC ESTER DERIVATIVES AND METHOD OF PRODUCING THE SAME
Stanley Kordzinski, Old Bridge, and Robert Raetz, Westfield, N.J., assignors to Catalin Corporation, a corporation of Delaware
No Drawing. Filed June 27, 1960, Ser. No. 38,766
19 Claims. (Cl. 260—29.3)

This invention relates to certain resins modified with glycolic ester derivatives of polycarboxylic synthetic polymers. The class of resins which are so modified may be described as thermosetting resins resulting from the condensation of two or more reactants which in the course of such condensation pass through a water soluble phase. A common example of such a resin is the usual phenol formaldehyde type resin, but other examples are discussed below in this application.

In view of the fact that the resin which is to be modified passes through a water soluble stage, the simplest and easiest way of modifying such resin is to use either ethylene ester derivatives or propylene ester derivatives of the polycarboxylic synthetic polymers. Such derivatives are themselves water soluble and can be incorporated with the resinous body while the latter is still in the water soluble stage.

While the use of such lower polycarboxylic esters is preferred, it is possible to use higher esters. In such case where the ester derivatives are not water soluble they can be incorporated with the resin by the use of a mutual solvent, for example, in many cases this can be done by the use of alcohol.

We have not been able to determine definitely whether or not any reaction takes place between the ester derivatives of the polycarboxylic polymers and the resins and therefore we term the combination of the resins with the derivatives as "blends" or "mutual solutions." However, in view of the highly reactive groupings that are present, we think that it is very probable that some reaction does take place.

The blends which we produce in accordance with this invention appear to be compatible in all proportions since they do not separate, develop cloudiness, or show other signs of incompatability even after long storage. These blends cure to form strongly moisture resistant bonds with metals, glass, quartz, and other siliceous materials. The glycolic ester derivatives shorten the curing time of the thermosetting resins and this is of great advantage not only in bonding applications but also in molding and casting operations where the time factor is often critical. We have also found that films cured from the blends of our invention are much harder than those prepared from the thermosetting resins alone and this is highly important for coating applications where film hardness is very desirable. It is also believed that the glycolic ester derivatives have a beneficial effect in the dispersal of thermosetting resins in water and water-alcohol systems.

It is essential that the glycolic ester derivatives be prepared separately and then added to the thermosetting resins to achieve the benefits of the invention. Simultaneous polymerization of the polycarboxylic synthetic polymer and condensation of the thermosetting resin in the same reaction has been attempted but the results have not been satisfactory. This is probably due to the fact that the reaction conditions needed for condensation of the thermosetting resin to form homogeneous compatible admixtures thereof inhibit vinyl type polymerization or copolymerization and as a result the high molecular weight polycarboxylic synthetic polymer from which the glycolic ester derivative is derived cannot form in the mix.

The fact that the glycolic ester derivative must be prepared separately and then blended with the thermosetting resin does not mean that condensation of the thermosetting resin cannot be carried out in the presence of the glycolic ester derivative. Since reaction conditions for vinyl type polymerization or copolymerization are no longer necessary, the glycolic ester derivative can be included as part of an initial reaction mixture suitable for preparing a thermosetting resin and then the reaction between the ingredients of the thermosetting resin in the mixture can be carried out to any desired stage of condensation. This procedure has in fact been used and all of the benefits of the invention have been fully achieved.

In general the glycolic ester derivatives can be blended with the thermosetting resins at any time before the resins are finally cured. However, since the glycolic ester derivatives are water soluble and prepared in the form of an aqueous solution, we prefer to blend the derivative with the thermosetting resin while the resin is in a water soluble stage of condensation when water is a mutual solvent for both the resin and the derivative. If the derivative is blended with the resin at a time when the resin is in a hydrophobic stage of condensation then water can be removed from the system by evaporation to achieve a compatible blend of resin and derivative. As an alternative the derivative can be first dissolved in an organic solvent such as ethyl or isopropyl alcohol, acetone, methyl or butyl Cellosolve, ethylene or propylene glycol, which also readily dissolves the hydrophobic resin to form a compatible non-aqueous blend of the resin and derivative. However, it is known that thermosetting resins, when used as bonding agent for glass fibers in the manufacture of rock wool and similar products, are shipped to the manufacturer in the form of aqueous solutions or dispersions and when the blends of our invention are used for such purpose it is essential from a commercial point of view, that the glycolic ester derivative be blended with the thermosetting resin before the resin has developed hydrophobic characteristics.

Any of the known thermosetting resins which are formed by condensation of two or more reactants and which pass through a water soluble stage of condensation can be modified with the glycolic ester derivtives in accordance with the invention. Phenolic resins prepared by condensation of phenol, cresols, xylenols, resorcinol, and mixtures thereof with an aldehyde such as formaldehyde, paraformaldehyde, acetaldehyde, propionaldehyde, acrolein, or furfural are well known in the art and in general the resins are prepared commercially by condensation reaction with formaldehyde or furfural and these are preferred. In addition to the preferred phenolic resins, other thermosetting resins such as the condensates of urea, thiourea, melamine, aniline and sulfonamides with aldehydes such as formaldehyde, acetaldehyde, and acrolein, referred to in the art as amino resins and generally prepared by condensation reaction between the amino compound and formaldehyde, may be blended with the glycolic ester derivative. Preferred resins of this class are melamine-formaldehyde and urea-melamine-formaldehyde resins. Other resins that may be modified with the glycolic ester derivatives are epoxy and polyester resins. The thermosetting resins described above are well known commercial resins and when used in accordance with the present invention these thermosetting resins are prepared in conventional manner by conventional techniques well known in the art.

The glycolic ester derivatives which we use in carrying out our invention are reaction products of alkylene oxides such as ethylene and propylene oxides with polycarboxylic synthetic polymers such as ethylene-maleic anhydride or maleic acid copolymers and polyacrylic acid, polymethacrylic acid, styrene-maleic anhydride or maleic acid copolmers and alkali metal salts thereof. These polycarboxylic compounds are linear polymers and copolymers which have acidic carboxylic or anhydride groups attached to the polymer chain as is known in the art. In the production of these products the alkylene oxides react with the carboxylic or anhydride groups to form hydroxyalkyl esters and these compounds are referred to throughout this specification as glycolic ester derivatives. The polycarboxylic polymers and copolymers are well known commercial products and for the purposes of this invention these are prepared in conventional manner.

The alkylene oxide reaction may also be carried out with alkali metal salts of the above polycarboxylic synthetic polymers. In this case inorganic alkali metal salt will be present with the glycolic ester derivative and this may be less desirable than a salt-free derivative depending on the particular thermosetting resin which is to be modified and the contemplated use of such modified resin. However, the presence of a minor amount of alkali metal salt is not objectionable in most cases. If desired the glycolic ester derivative can be passed through ion exchange resins to remove inorganic salt prior to blending with the thermosetting resin.

As regards the proportions of the glycolic ester derivatives to the thermosetting resin, we have found that as little as ¼ of 1% of the glycolic ester derivative will give a noticeable effect and in general it is not necessary to use more than 25% of the glycolic ester derivative. A preferred range usually will include between ½ of 1% and 20% of the glycolic ester derivative based on the weight of the resinous bodies in the mixture.

Alkylene oxides are known in the art and may be represented by the general formula:

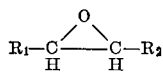

The homologous series begins with the parent compound ethylene oxide where $R_1$ and $R_2$ are hydrogen atoms. Ethylene oxide as well as propylene oxide where $R_2$ is a methyl group are the alkylene oxides we prefer to use to form water soluble glycolic ester derivatives which are compatible with thermosetting resins in accordance with the invention.

Higher molecular weight alkylene oxides of the above formula where $R_1$ is hydrogen atom, halogen atom, alkoxy group, or an alkyl group having up to 20 carbon atoms and $R_2$ is hydrogen atom, an alkyl group having up to 20 carbon atoms, aryl group or an alkylaryl group may also be used. Examples of these are 1,2-epoxydecane, styrene oxide, p-butylphenyl ethylene oxide, epichlorohydrin, 1-propyl-2-ethoxyethylene oxide, 1-ethoxy-2-phenylethylene oxide and 1-propoxy-2-(p-propylphenyl) ethylene oxide. Many of the derivatives formed with these higher molecular weight alkylene oxides are only slightly water soluble or completely water insoluble and therefore should be used only in minor proportion in combination with the water soluble ethylene or propylene oxide derivatives when the thermosetting resin is modified at a water soluble stage of condensation. At later hydrophobic stages of condensation the resin may be modified with the water insoluble derivatives by using mutual solvents such as alcohols, ketones, ethers, and glycols as mentioned hereinabove.

The basic structure of the glycolic ester derivative depends on the particular polycarboxylic synthetic polymer reacted with the alkylene oxide. For example, with styrene-maleic anhydride, maleic acid copolymers or metallic salts thereof, the alkylene oxide will form a derivative having a structure represented by the formula:

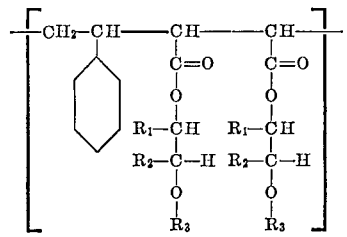

in which $R_1$ and $R_2$ represent the same substituents specified hereinabove for the general formula for the alkylene oxide and $R_3$ represents hydrogen atom or one or more additional alkylene oxide groups. Also, as is known in the art, styrene can be copolymerized with partially esterified maleic acid where one of the maleic acid carboxylic groups is esterified prior to copolymerization. The product of copolymerization may be termed a styrene maleic acid half-ester copolymer and this copolymer can be reacted with alkylene oxides to form monoglycolic ester derivatives which are compatible with thermosetting resins in accordance with the invention. The basic structure is represented by the formula:

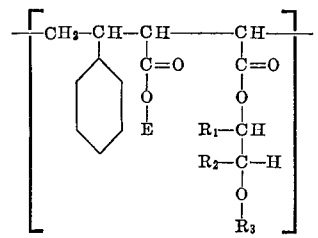

where E represents the ester group of the partially esterified maleic acid and $R_1$ and $R_2$ represent the same substituents specified hereinabove for the general formula for the alkylene oxide and $R_3$ represents hydrogen atom or one or more additional alkylene oxide groups.

As described above the alkylene oxide can be reacted with polyacrylic or polymethacrylic acids to form glycolic ester derivatives. These acids are conventionally prepared by direct polymerization of the corresponding monomers or by hydrolysis of polymerized esters of the monomers. They are water soluble and react readily with alkylene oxides to form glycolic ester derivatives represented by the formula:

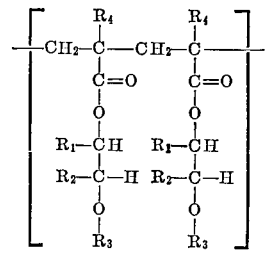

where $R_4$ is hydrogen or methyl group in the polyacrylic and polymethacrylic acids respectively, $R_1$ and $R_2$ represent the same substituents specified hereinabove for the general formula for the alkylene oxide and $R_3$ represents hydrogen atom or one or more additional alkylene oxide groups.

Ethylene-maleic anhydride or maleic acid copolymers are another known class of polycarboxylic synthetic polymers which can be reacted with alkylene oxides to form glycolic ester derivatives which are compatible with water soluble thermosetting resins in accordance with the invention. The structure of these particular glycolic ester derivatives may be represented by the formula:

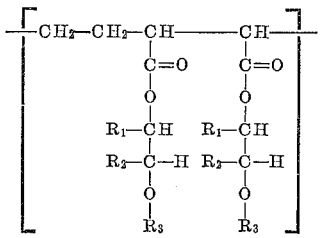

in which $R_1$ and $R_2$ represent the same substituents specified hereinabove for the general formula for the alkylene oxide and $R_3$ represents hydrogen atom or one or more additional alkylene oxide groups.

As described above for commercial purpose in the bonding of glass fibers the glycolic ester derivatives should be blended with thermosetting resins which are still in the water soluble stage of condensation and the blend shipped as an aqueous solution or dispersion. Therefore, condensation of the resin should be controlled and the glycolic ester derivative should be added to the resin before it has condensed to the hydrophobic stage. The derivative can be added either to an initial reaction mixture containing the ingredients of a thermosetting resin prior to condensation or the derivative may be added during condensation at any time before the resin has developed definite hydrophobic characteristics. After the derivative is added the solution is applied to the fibers and the condensation reaction is continued to completion to cure the resin into a hard insoluble infusible solid.

If desired, condensation can be stopped and the derivative added to the resin while in the water soluble stage. The resulting mixture can then be concentrated to a solid without further condensation by distilling off organic solvent or water by means of vacuum distillation. The resin can be shipped in solid state and final condensation in such case is carried out by the ultimate user.

For example, with phenol-formaldehyde resins a resol or novolak type resin is first prepared by conventional means through the reaction of phenol and formaldehyde at an elevated temperature and in the presence of an alkaline or acid catalyst. This reaction is carried beyond phenol alcohol formation to the stage where definite condensation to resinous condition has taken place and the content of unreacted formaldehyde ceases to fall rapidly. The reaction is then stopped before there is any substantial precipitation of the resin or gelling of the solution. At this stage the resin is soluble in water, alcohols, and acetone and completely compatible with the glycolic ester derivatives of the present invention.

The water soluble stage of condensation is conventionally determined by measuring the fall of formaldehyde concentration in the reaction mass or by water tests. The reaction is stopped after the content of the free formaldehyde begins to level off. This usually occurs within the range of about 1% to 10% free formaldehyde, the exact leveling off percentage depending upon the molecular proportion of formaldehyde to phenol in the original mixture subjected to condensation. The reaction may also be stopped when a sample of the phenol-formaldehyde reaction mixture first shows a cloud in water at infinite dilution at 25° C. The leveling off of the free formaldehyde concentration and the water tests specified above are also customarily used in the art to determine the water soluble stage of condensation of amino resins.

The glycolic ester derivative is most conveniently prepared by direct reaction between the alkylene oxide and the polycarboxylic synthetic polymer. The reaction may be carried out in aqueous solution and preferably at an elevated temperature under reflux. The pH of the conventional polycarboxylic synthetic polymer in aqueous solution will vary from about 1.0 to about 3.0 and the reaction with alkylene oxide is preferably continued until the polycarboxylic polymer has been fully esterified. This and the amount of alkylene oxide required is readily determined by measuring the pH of the reaction mixture during the reaction. When the pH reaches the range of about 7.0 to about 9.0 the reaction is considered to be completed and the polycarboxylic synthetic polymer fully esterified. The glycolic ester derivative is then mixed with the thermosetting resin in any desired proportion as described above. If desired the polycarboxylic synthetic polymer need only be partially esterfied with alkylene oxide in which case the glycolic ester derivative will contain free carboxylic acid groups and the pH of the final reaction mixture will be less than 7. Preferably partial esterification is carried out until the pH of the final reaction mixture is not less than 4.5.

If desired the viscosity of the modified thermosetting resin may be adjusted by vacuum dehydration or by dehydrating the thermosetting resin and glycolic ester derivative separately under vacuum prior to mixing. Conventional equipment customarily used in the art may be employed to accomplish mixing, vacuum dehydration and the reactions specified above.

The following specific examples further illustrate the invention. It will be understood that the examples are only given for the purpose of illustration and that the invention is not limited thereto. In the examples and throughout the specification, unless stated otherwise, percentages and parts are calculated on a weight basis.

PREPARATION OF GLYCOLIC ESTER DERIVATIVES

Example 1

167 parts of maleic anhydride and 518 parts of methyl ethyl ketone were charged to a clean, dry, 500 gal. nickel reactor. The reactor was flushed with nitrogen gas and the solution was heated. 0.86 part of benzoyl peroxide, dissolved in 178 parts of styrene, was added to the reactor. Heating was continued until the reactor ingredients reached reflux temperatures and after 2 hours, 75 parts of distilled water was added. Flushing with nitrogen gas was discontinued and reflux was continued for another 30 minutes. 1800 parts of distilled water was then added and the mixture was heated to a temperature of 70° C. Then 244 parts of a 25.1% aqueous solution of sodium hydroxide along with 0.09 part of a conventional antifoam agent (sold under the trade name Dow Corning Antifoam A and dissolved in 210 ml. of methyl ethyl ketone) were added to the mixture. The methyl ethyl ketone was distilled off at atmospheric pressure until the reaction mixture reached a temperature of 82° C. and the mass was placed under vacuum and held at that temperature for about 40 minutes. 2,266 parts of distilled water was then added and the reaction mixture was cooled to 46° C. The polymer solution was very viscous at this point.

200 parts of propylene oxide were added to the polymer solution which was agitated for 15 minutes without heating. The temperature was then raised to 60° C., held there for an hour and then raised to 70° C. and held there for 2 hours. The pH of the polymer solution was periodically checked and when the pH was within the range of 7.0 to 9.0 the solution was cooled and removed from the reactor.

The dihydroxypropylated styrene-maleic anhydride copolymer had the following characteristics:

Viscosity at 25° C., poises (Brookfield, Model LVM) _____ 20.0
pH at 25° C. _____ 8.3
Hellige color _____ 3.0
Solids at 105° C. _____ 21.4

Example 2

212.0 parts of maleic anhydride were dissolved in 1022.5 parts of methyl ethyl ketone in a 3 neck flask equipped with a motor driven stirrer, a condenser and a thermometer. A nitrogen atmosphere was provided in the free space above the solution which was heated to 72° C. 225.5 parts of styrene and 1.1 parts of benzoyl peroxide were then mixed in and after 13 minutes the temperature of the mixture rose to 80° C. Polymerization of the mixture was continued for 2¼ hours and then 270 ml. of water was added in 100 ml. increments over a period of 2 hours. At the end of the 2 hour period the styrene-maleic anhydride copolymer had hydrolyzed to its corresponding polycarboxylic acid and was in the form of a clear solution.

100 ml. of propylene oxide was added to the solution at a temperature of 61° C. In 5 minutes the temperature rose to 64° C. After 2 minutes another 100 ml. of propylene oxide was added. The temperature continued to rise and reflux was noted. After 1½ hours the reflux subsided. 345 ml. of propylene oxide was then added and the temperature of the solution was allowed to fall to room temperature. The pH of the solution just before propylene oxide was added was 1.19 at 23° C. and was 1.65 at 23° C. after all the propylene oxide had reacted.

One liter of 2-methoxyethanol was added to the solution and the methyl ethyl ketone and water were distilled off at 120° C. at atmospheric pressure and then under vacuum at 95.5° C. Final yield of the salt free dihydroxy propylated styrene-maleic anhydride copolymer derivative 2154 parts.

A film of the final solution was cast on a glass plate and placed in an oven at 80° C. The cured film was hard, clear and strongly adhered to the glass plate. After several days in the oven the film was insoluble in 2-methoxyethanol.

Example 3

1 mol of a 25% aqueous solution of polyacrylic acid was placed in a flask equipped with a thermometer, reflux condenser, agitator and dropping funnel. To this was added 3 mols of propylene oxide through the dropping funnel over a period of 90 minutes. By controlling the rate of addition the contents of the flask were held just at the point of reflux. The temperature rose from 28° C. at the start to 63° C. at the end of the addition of propylene oxide. The resulting polyhydroxypropylated polyacrylic acid compound was heated to 100° C. No reflux took place indicating that the reaction had gone to completion. The pH of the product was 5.0 and the viscosity was 510 centipoises. The original polyacrylic acid had a viscosity of 250 poises.

The above three examples illustrate the preparation of three specific glycolic ester derivatives. Other derivatives are prepared in similar conventional manner by mixing the selected polycarboxylic polymer or copolymer and the selected alkylene oxide and then maintaining the mixture at reflux until the reaction is completed to form the derivative. The reflux temperature varies depending on the reactivity of the particular alkylene oxide that is selected. In some cases the reaction rate is so rapid that no heat is required and the alkylene oxide must be added slowly to control and maintain the mixture at reflux. In other cases the reaction rate is very slow at room temperatures and the mixture will have to be heated to initiate and maintain the mixture at reflux.

PREPARATION OF PHENOLIC RESINS MODIFIED WITH GLYCOLIC ESTER DERIVATIVES

Example 4

A resol type phenolic resin was prepared in conventional manner with 1000 parts phenol, 1640 parts of a 44% aqueous solution of formaldehyde and 50 parts of a 50% aqueous solution of sodium hydroxide. The ingredients were reacted at 70° C. for 30 minutes after which another 50 parts of the sodium hydroxide solution was added. The condensation period was continued at 70° C. for an additional 95 minutes after which the reaction product was cooled to 40° C. and partially dehydrated under vacuum. The cooled partially dehydrated resin was passed through a column containing cation exchange resin to remove sodium ions and the pH of the effluent was adjusted to 7.3 with aqueous sodium hydroxide solution.

The deionized phenolic resin was vacuum dehydrated to a viscosity of 86 centipoises at 25° C. A sample of the resin was tested in water at infinite dilution at 25° C. and the absence of any cloud showed that the resin was still in a water soluble stage of condensation. 5 parts of the product of Example 1 were then mixed with 95 parts of the phenolic resin. The resinous solution had the following characteristics:

| | |
|---|---|
| Viscosity at 25° C., poises | 2.55 |
| Specific gravity at 25° C. | 1.22 |
| pH at 25° C. | 7.28 |
| Water tolerance, percent | Infinite |
| Free formaldehyde | 3.50 |
| Solids, percent | 61.23 |

The solution was stored at room temperature for 30 days without any signs of separation. A film of the solution was cast on a glass plate and cured at 125° C. The cured film was hard and strongly adhered to the glass plate.

Example 5

A resol type phenolic resin was prepared with 1000 parts phenol, 949 parts of a 37.1% aqueous solution of formaldehyde and 15.0 parts of a 50% aqueous solution of sodium hydroxide in conventional manner as described in Example 4 with the exception that the resin was not passed through an ion exchange column. The condensation product had viscosity of 4.3 poises at 25.0° C. A sample of the condensation product was tested in water at infinite dilution at 25° C. and the absence of any cloud showed that the resin was still in a water soluble stage of condensation. 2 parts of the product of Example 1 were added to 98 parts of the phenolic resin. The resulting resinous solution had the following characteristics:

| | |
|---|---|
| Viscosity at 25° C., poises | 4.43 |
| Specific gravity at 25° C. | 1.206 |
| pH at 25° C. | 8.01 |
| Water tolerance at 250° C., percent | 450 |
| Free formaldehyde, percent | 0.8 |
| Gel time at 150° C., min. and sec. | 4′30″ |
| Solids, percent | 74.2 |

The solution was stored at room temperature for 30 days without any signs of separation. A film of the solution was cast on a glass plate which cured at 150° C. in 4½ minutes. The cured film was hard and strongly adhered to the glass plate.

Example 6

A water soluble phenolic resin was prepared in conventional manner as in Example 5 with 1000 parts phenol, 1950 parts of a 44% aqueous solution of formaldehyde and 90 parts of a 50% aqueous solution of sodium hydroxide. The resulting liquid resin was partially dehydrated under vacuum in conventional manner and then passed through a column of cation exchange resin to remove sodium ions. The pH of the affluent was adjusted to 6.5 with aqueous sodium hydroxide solution. A sample of the phenolic resin was tested in water at infinite dilution at 25° C. and the absence of any cloud showed that the resin was still in a water soluble stage of condensation.

The deionized phenolic resin was vacuum dehydrated to a specific gravity of 1.227 at 25° C. and 2 parts of the product of Example 1 were added to 98 parts of the phenolic resin. The resinous solution had the following characteristics:

| | |
|---|---|
| Viscosity at 25° C., poises | 1.05 |
| Specific gravity at 25° C. | 1.227 |
| pH at 25° C. | 6.43 |
| Water tolerance, percent | Infinite |
| Free formaldehyde, percent | 5.0 |
| Solids, percent | 61.3 |

The resinous solution was stored at room temperature for 30 days without any sign of separation. A film of the solution was cast on a glass plate and cured at 135° C. The cured film was hard and strongly adhered to the glass plate.

*Example 7*

A lime catalyzed resin was prepared with 1000 parts phenol, 1160 parts of a 44% aqueous solution of formaldehyde and 25 parts of lime ($Ca(OH)_2$). The ingredients were heated to 80° C. and condensed at that temperature until the solution of resinous condensation product showed a water tolerance of 200% to 300%. The condensation product was vacuum dehydrated in conventional manner to a viscosity of 2.5 poises at 25° C. The yield of dehydrated resin was 1,720 parts to which were added 35 parts of the product of Example 1. The resinous solution had the following characteristics.

| | |
|---|---|
| Viscosity at 25° C., poises | 3.12 |
| Specific gravity at 25° C. | 1.228 |
| pH at 25° C. | 8.43 |
| Set time at 135° C., seconds | 543 |
| Gel time at 150° C., min. and sec. | 5'03" |
| Water tolerance, percent at 25° C. | 320 |
| Free formaldehyde, percent | 0.63 |
| Solids, percent | 69.4 |

The resinous solution was stored at room temperature for 30 days without any signs of separation. A film of the resinous solution was cast on a glass plate which was cured at 135° C. in 15 minutes. The cured film was hard and strongly adhered to a glass plate.

*Example 8*

A solution of a resol type phenolic resin in ethyl alcohol was prepared by reacting 1000 parts phenol, 1710 parts of a 37% aqueous solution of formaldehyde and 61.50 parts of a 50% aqueous solution of sodium hydroxide for 20 minutes. A sample of the phenolic resin was tested in water at infinite dilution at 25° C. and the absence of any cloud showed that the resin was still in a water soluble stage of condensation. The condensation product was vacuum dehydrated to a yield of 1600 parts and the viscosity was adjusted to 60.2 poises at 25° C. with a solvent comprising 60% ethyl alcohol and 40% water. 5 parts of the product of Example 1 were dissolved in 95 parts of the phenolic resinous solution and the modified resinous solution had the following characteristics:

| | |
|---|---|
| Viscosity at 25° C., poises | 43.1 |
| Specific gravity at 25° C. | 1.237 |
| pH at 25° C. | 9.05 |
| Set time at 135° C., sec. | 371 |
| Gel time at 150° C., min. and sec. | 3'36" |
| Solids, percent | 71.94 |

The modified resinous solution was stored at room temperature for 30 days without any sign of separation. A film of the solution was cast on a glass plate which was cured at 135° C. in 15 minutes. The cured film was hard and strongly adhered to the glass plate.

*Example 9*

A water soluble phenolic resin was prepared in conventional manner as described in Example 5 with 1000 parts phenol, 1750 parts of a 44% aqueous solution of formaldehyde and 75 parts of a 50% aqueous solution of sodium hydroxide. A sample of the resin was tested in water at infinite dilution at 25° C. and the absence of any cloud showed that the resin was still in a water soluble stage of condensation. The product was vacuum dehydrated to a yield of 1950 parts and the dehydrated product had the following characteristics:

| | |
|---|---|
| Viscosity at 25° C., poises | 23.5 |
| Specific gravity at 25° C. | 1.289 |
| pH at 25° C. | 7.60 |
| Water tolerance at 25° C., percent | 1560 |
| Free formaldehyde, percent | 5.55 |
| Solids, percent | 74.46 |

To 80 parts of the above product was added 20 parts of the product of Example 1. The resulting solution had the following characteristics:

| | |
|---|---|
| Viscosity at 25° C., poises | 13.9 |
| Specific gravity at 25° C. | 1.240 |
| pH at 25° C. | 7.75 |
| Water tolerance, percent | Infinite |
| Free formaldehyde, percent | 4.24 |
| Solids, percent | 63.06 |

The modified solution was stored at room temperature for 30 days without any sign of separation. A film of the solution was cast on a glass plate and cured at 135° C. The cured film was hard and strongly adhered to the glass plate.

*Example 10*

A resol type phenolic resin was prepared in conventional manner as described in Example 4 with 1000 parts phenol, 949 parts of a 37.1% aqueous solution of formaldehyde and 10 parts of a 50% aqueous solution of sodium hydroxide. A sample of the resin was tested in water at infinite dilution at 25° C. and the absence of any cloud showed that the resin was still in a water soluble stage of condensation.

To 80 parts of the resinous product was added 20 parts of the product of Example 1. The modified product was stored at room temperature for 30 days without any sign of separation. A film of the solution was cast on a glass plate and cured at 135° C. The cured film was hard and strongly adhered to the glass plate.

*Example 11*

To 10 parts of the phenolic condensation product of Example 10 was added 90 parts of the product of Example 1. The results were the same as those in Example 10.

*Example 12*

To 20 parts of the phenolic condensation product of Example 5 was added 80 parts of the product of Example 1. The results were the same as those in Example 10.

*Example 13*

To 30 parts of the phenolic condensation product of Example 6 was added 70 parts of the product of Example 1. The results were the same as those in Example 10.

*Example 14*

To 90 parts of the phenolic condensation product of Example 10 was added 10 parts of the product of Example 1. The results were the same as those in Example 10.

*Example 15*

To 70 parts of the phenolic condensation product of Example 6 was added 30 parts of the product of Example 1. The results were the same as those in Example 10.

*Example 16*

A water soluble phenolic resin was prepared in conventional manner as described in Example 5 with 1000 parts phenol, 2340 parts of a 44% aqueous solution of formaldehyde and 110 parts of a 50% aqueous solution of sodium hydroxide. A sample of the phenolic resin was tested in water at infinite dilution at 25° C. and the absence of any cloud showed that the resin was still in a water soluble stage of condensation. 100 parts of the product of Example 1 was then added and the resinous solution was dehydrated to 62.5% solids.

Example 17

A triethylamine catalyzed phenolic resin was prepared by reacting 1000 parts of phenol with 1080 parts of a 44% aqueous solution of formaldehyde and 51 parts of triethylamine at 80° C. and in the presence of 100 parts of the product of Example 1. Condensation at 80° C. was continued for 1 hour and 33 minutes until the condensation product showed a water tolerance of 430%. The solution was then dehydrated to a yield of 1620 parts.

The solution was stored at room temperature for 30 days without any sign of separation. A film of the solution was cast on a glass plate and then cured at 135° C. The cured film was hard and strongly adhered to the glass plate.

Example 18

A cork bonding resin was prepared by reacting 1000 parts of phenol with 1600 parts of a 37% aqueous solution of formaldehyde in the presence of 61.5 parts of a 50% aqueous solution of sodium hydroxide at atmospheric reflux temperature for 20 minutes. A sample of the resin was tested in water at infinite dilution at 25° C. and the absence of any cloud showed that the resin was still in a water soluble stage of condensation. The condensation product was vacuum distilled to a yield of 1720 parts having a viscosity of 61 poises. 740 parts of diethylene glycol and 25 parts of the product of Example 1 were added to the yield. The final resinous solution had the following characteristics:

| | |
|---|---|
| Viscosity at 25° C., poises | 7.4 |
| Specific gravity at 25° C. | 1.227 |
| pH at 25° C. | 9.13 |
| Water tolerance at 25° C., percent | 1100 |
| Free formaldehyde, percent | 1.1 |
| Gel time at 150° C., min. and sec. | 4'16" |
| Solids, percent | 75.25 |

The solution was stored at room temperature for 30 days without any sign of separation. A film of the solution was cast on a glass plate and cured at 135° C. The cured film was hard and strongly adhered to the glass plate.

Example 19

A novolak type resin was prepared by reacting 1000 parts of phenol with 650 parts of a 44% aqueous solution of formaldehyde diluted with 120 parts of water, in the presence of 6.65 parts of a 30% aqueous solution of sulfuric acid. The ingredients were refluxed at atmospheric pressure for 5 minutes after which 46 parts of the sulfuric acid was added and reflux was continued for an additional 55 minutes. The resin was then cooled to 90° C. and the pH was adjusted to 5.4 with aqueous sodium hydroxide. 30 parts of the product of Example 1 were then added and the modified novolak condensation product was dehydrated at 140° C. and under 29 inches of vacuum. The product was cooled and when solidified was ground up with 6½% hexamethylenetetramine. The powdered modified novolak product had the following characteristics:

| | |
|---|---|
| Stroke cure at 150° C., sec. | 83 |
| Rigid cure at 150° C., sec. | 100 |
| Melting point capillary, °C. | 81 |
| Melting point Nagel, °C. | 105 |
| Inclined plate flow at 125° C., mm | 44 |

The modified novolak product thermoset faster than the novolak product alone.

Example 20

A one stage powdered resin was prepared by reacting 1000 parts of phenol with 432 parts of a 44.3% aqueous solution of formaldehyde diluted with 84 parts of water and 61.6 parts of hexamethylenetetramine at atmospheric reflux for 45 minutes. 30 parts of the product of Example 1 were then added and the resin solution was vacuum dehydrated. The dehydrated one stage resin was poured on a cooling tray and ground up when hard. The product had the following characteristics:

| | |
|---|---|
| Stroke cure at 150° C., sec. | 45 |
| Rigid cure at 150° C., sec. | 133 |
| Capillary melting point, °C. | 70.2 |
| Inclined plate flow at 125° C., mm. | 34 |

The modified resin thermoset faster than the resin alone.

Example 21

A cresylic acid laminating resin was prepared by reacting 920 parts of commercially available cresylic acid with 547 parts of a 44% aqueous solution of methanol-free formaldehyde and 21 parts of hexamethylenetetramine at atmospheric reflux for 80 minutes. The condensation product was vacuum dehydrated to a yield of 1125 parts and diluted with 405 parts of ethyl alcohol and 170 parts of isopropyl alcohol. To the alcoholic resin solution were added 17 parts of the product of Example 1.

The resinous solution was stored at room temperature for 60 days without any sign of separation. A film of the solution was cast on a glass plate and cured at 135° C. The cured film was hard and strongly adhered to the glass plate.

Example 22

1 mol of a 25% aqueous solution of polyacrylic acid and 45 parts of a 10% aqueous solution of sulfuric acid were charged to a flask. To this was slowly added 15 mols of propylene oxide over a 2 hour period. By controlling the rate of addition the temperature of the reaction was rapidly raised to 75° C. and held at 75° to 80° C. during the 2 hours after which the temperature was raised to 100° C. No reflux took place indicating that the reaction had gone to completion. The pH of the product was 3 and the viscosity was 372 centipoises.

3 parts of the product were mixed with 97 parts of a conventionally prepared water soluble phenolic resin as described in Example 5. The modified phenolic resin was stored at room temperature for 30 days without any sign of separation. A film of the modified resin was cast on a glass plate and cured at 135° C. The cured film was hard and strongly adhered to the glass plate.

Example 23

1 mol of a 25% aqueous solution of polyacrylic acid and 90 parts of a 10% aqueous solution of sulfuric acid were reacted with 20 mols of propylene oxide which was slowly added. The temperature of the reaction was held at 50° to 55° C. by cooling and controlling addition of the propylene oxide. The final product had a pH of 2.5 and a viscosity of 360 centipoises.

3 parts of the product were dissolved in 97 parts of a conventionally prepared water soluble phenolic resin as described in Example 5. The modified phenolic resin was stored at room temperature for 30 days without any sign of separation. A film of the modified resin was cast on a glass plate and cured at 135° C. The cured film was hard and strongly adhered to the glass plate.

PREPARATION OF AMINO RESINS MODIFIED WITH GLYCOLIC ESTER DERIVATIVE

Example 25

A water soluble melamine resin was prepared as follows: 7080 parts of a 40% methanol solution of paraformaldehyde were charged to a reactor. The pH of the solution was adjusted to within the range 9.4 to 9.6 with aqueous sodium hydroxide and then 2380 parts of melamine were added. The ingredients were heated to 70° C. in 30 minutes and held at that temperature until all of the melamine had dissolved. In the meantime 31.1 parts of oxalic acid was dissolved in 120 parts of methanol and this solution was diluted with 3740 parts of methanol. After the melamine had dissolved, the alcoholic oxalic acid solution was added to the reactor. The temperature of the resin mixture was then held at 60° C. and the free formaldehyde concentration by salt titer was checked in conventional manner at 5 minute intervals. When the salt titer was 9 ml., the pH of the resin mixture was adjusted to 10.0 with aqueous sodium hydroxide.

After the resin mixture was filtered through a bed of diatomaceous earth 30 parts of triethanolamine was added and the resin was concentrated to a specific gravity of 1.315 under vacuum. The resin was then diluted with water to a specific gravity of 1.265 and the pH was adjusted to 9.3 with sodium hydroxide solution. 12 parts of sodium tetraborate dissolved in warm water was then added to the resin which was cooled to 25° C. and filtered through cloth into a drum. The yield was approximately 6000 parts of a resin solution containing 80% solids. The resin solution had the following characteristics:

| | |
|---|---|
| Viscosity at 25° C., poises | 17 |
| Specific gravity at 25° C. | 1.265 |
| pH at 25° C. | 9.5 |
| Free formaldehyde, percent | 1.2 |
| ASTM solids at 105° C., percent | 80.0 |

To 95 parts of the above water soluble melamine resin were added 5 parts of the product of Example 1. The modified melamine resin was stored for 40 days without any sign of separation. A swatch of cotton fabric was dipped in the modified melamine resin which cured much faster than the melamine resin alone.

*Example 26*

A water soluble urea-melamine-formaldehyde resin was prepared by charging 5400 parts of a 40% methanol solution of paraformaldehyde, 1234 parts of melamine, 598 parts of urea and 60 parts of triethanolamine to a reactor. The pH of the reactants was adjusted to 8.7 with 5 N aqueous formic acid solution. The reactants were heated to reflux at 82° C. and held there until all of the melamine and urea had dissolved. Then the solution was cooled to 60° C. and 2000 parts of methanol were added to the solution followed by slow addition of 240 parts of a 28% aqueous solution of sulfuric acid. The solution was held at 60° C. and the free formaldehyde concentration by salt titer was checked in conventional manner at 10 minute intervals. When the salt titer was 9.0 ml., 179 parts of a 25% aqueous solution of sodium hydroxide was added. 30 parts of diatomaceous earth was added to the solution with agitation and then the solution was filtered. 25 parts of triethanolamine was added to the solution which was then dehydrated under vacuum to 4275 parts of resin solution. Thereafter 130 parts of methanol and 530 parts of water were dissolved in the resin solution which was cooled to 25° C. and then poured into a drum. The resin solution had the following characteristics:

| | |
|---|---|
| Viscosity at 25° C., poises | 10 |
| Specific gravity at 25° C. | 1.235 |
| pH at 25° C. | 7.2 |
| Water tolerance, percent | Infinite |
| Free formaldehyde, percent | 1.7 |
| Solids (urea method), percent | 80 |

To 950 parts of the water soluble urea-melamine-formaldehyde resin were added 50 parts of the product of Example 3. The modified urea-melamine-formaldehyde resin was stored at room temperature for 20 days without any sign of separation and the modified resin cured much faster than did the resin alone.

*Example 27*

126 parts of a commercially available ethylene-maleic anhydride copolymer is added to 1260 parts of distilled water in a reactor. The mixture is heated until the copolymer is completely dissolved and then cooled to 25° C. 390 parts of 1-propyl-2-ethoxyethylene oxide are then added to the copolymer solution and the temperature is raised to 90° C. for about 6 hours. The pH of the solution is periodically checked and when the pH reaches about 5 the solution is cooled and removed from the reactor.

50 parts of this solution is blended with 950 parts of the alcoholic solution of the phenolic type resin prepared in Example 21. The blend is stored for 30 days without any sign of separation. The blend is cast as a film on a glass plate and cured at 135° C. The cured film is hard and strongly adheres to the glass plate.

*Example 28*

The procedure, ingredients and proportion of ingredients of Example 27 are repeated except that 1,2-epoxydecane is used in place of 1-propyl-2-ethoxyethylene oxide. The results are the same as those in Example 27.

*Example 29*

29 parts of phthalic anhydride, 19 parts of maleic anhydride, 15 parts of propylene glycol and 12 parts of ethylene glycol are charged to a reactor. The mixture is heated under reflux until a sample of the polyester resin formed is found to be in a water soluble stage of esterification by the conventional water test. Then 950 parts of the product of Example 1 are blended with the polyester resin.

The modified polyester resin is stored at room temperature for 30 days without any sign of separation. A film of the modified resin is cast on a glass plate and cured at 135° C. The cured film is hard and strongly adheres to the glass plate.

Although the modified thermosetting resins of the invention have been described in terms of their improved film forming characteristics and their particular utility as bonding agents for glass and metals, it will be understood that their use is not so limited. The modified resins are suitable for preparing laminates of paper, fabrics and wood, as impregnating resins for textile goods, for producing sandpaper and foundry core molds, and for other industrial applications. All of these applications are benefited by the exceptional bonding characteristics and the fast cure of the modified resins. Also, it has been found that the glycolic ester derivatives of the invention lower the surface tension of water and this has led to the use of the water soluble derivatives as detergents and dispersing agents.

It will be understood that it is intended to cover all changes and modifications of the preferred embodiment of the invention herein chosen for the purpose of illustration which do not constitute departures from the spirit and scope of the invention.

What is claimed is:

1. A curable resinous composition which comprises a homogeneous compatible admixture of (A) a thermosetting resin which is thermally advanceable to an insoluble, infusible final stage of cure and which during its preparation by condensation of at least two reactants passes through a water soluble stage of condensation, and up to about 25% by weight of (B) the reaction product having a pH at least about 4.5 of (1) an alkylene oxide with (2) a polycarboxylic synthetic polymer selected from the group consisting of styrene-maleic anhydride copolymer, styrene-maleic acid copolymer, an alkali metal salt of styrene-maleic acid copolymer, ethylene-maleic anhydride copolymer, ethylene-maleic acid copolymer, an alkali metal salt of ethylene-maleic acid copolymer, polyacrylic acid and polymethacrylic acid.

2. A curable resinous composition in accordance with claim 1 in which the alkylene oxide has a structure represented by the formula:

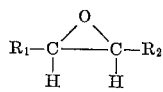

R₁ being selected from the group consisting of hydrogen atom, alkyl radical having up to twenty carbon atoms, aryl and alkylaryl radicals, and R₂ being selected from the group consisting of hydrogen atom, halogen atom and alkoxy radical.

3. A curable resinous composition in accordance with claim 1 in which the thermosetting resin is a water soluble condensation product of an aldehyde and a compound selected from the group consisting of a phenol, urea, melamine, and a mixture of urea and melamine.

4. A curable resinous composition which comprises a homogeneous compatible admixture of (A) a solvent, (B) a water soluble condensation product of (1) an aldehyde and (2) a compound selected from the group consisting of a phenol, urea, melamine, and a mixture of urea and melamine, which condensation product is thermally advanceable to an insoluble, infusible final stage of cure, and up to about 25% by weight of (C) the reaction product having a pH at least about 4.5 of (1) an alkylene oxide having a structure represented by the formula:

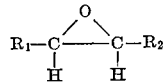

R₁ being selected from the group consisting of hydrogen atom, alkyl radical having up to twenty carbon atoms, aryl and alkylaryl radicals, R₂ being selected from the group consisting of hydrogen atom, halogen atom and alkoxy radical, with (2) a polycarboxylic synthetic polymer, said polymer being selected from the group consisting of styrene-maleic anhydride copolymer, styrene-maleic acid copolymer, an alkali metal salt of styrene-maleic acid copolymer, ethylene-maleic anhydride copolymer, ethylene-maleic acid copolymer, an alkali metal salt of ethylene-maleic acid copolymer, polyacrylic acid and polymethacrylic acid.

5. A curable resinous composition in accordance with claim 4 in which the solvent is water.

6. A curable resinous composition in accordance with claim 4 in which the solvent is a mixture of water and an aliphatic alcohol having up to six carbon atoms.

7. A curable resinous composition in accordance with claim 4 in which the solvent is an aliphatic alcohol having up to six carbon atoms.

8. A solid curable resinous composition which comprises a homogeneous compatible admixture of (A) a condensation product of (1) an aldehyde and (2) a compound selected from the group consisting of a phenol, urea, melamine, and a mixture of urea and melamine, which condensation product is thermally advanceable to an insoluble, infusible final stage of cure, and up to about 25% by weight of (B) of reaction product having a pH at least about 4.5 of (1) an alkylene oxide having a structure represented by the formula:

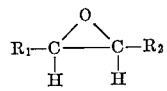

R₁ being selected from the group consisting of hydrogen atom, alkyl radical having up to twenty carbon atoms, aryl and alkylaryl radicals, R₂ being selected from the group consisting of hydrogen atom, halogen atom and alkoxy radical, with (2) a polycarboxylic synthetic polymer, said polymer being selected from the group consisting of styrene-maleic anhydride copolymer, styrene-maleic acid copolymer, an alkali metal salt of styrene-maleic acid copolymer, ethylene-maleic anhydride copolymer, ethylene-maleic acid copolymer, an alkali metal salt of ethylene-maleic acid copolymer, polyacrylic acid and polymethacrylic acid.

9. A cured permanently insoluble infusible resinous solid having a composition in accordance with claim 8.

10. A curable resinous composition which comprises a homogeneous compatible admixture of a water soluble condensation product of phenol and formaldehyde, which condensation product is thermally advanceable to an insoluble, infusible final stage of cure, and up to about 25% by weight of the reaction product having a pH at least about 4.5 of propylene oxide with styrene-maleic acid copolymer.

11. A curable resinous composition which comprises a homogeneous compatible admixture of a water soluble condensation product of phenol and formaldehyde, and up to about 25% by weight of the reaction product having a pH at least about 4.5 of propylene oxide with polyacrylic acid.

12. A curable resinous composition which comprises a homogeneous compatible admixture of a water soluble condensation product of urea and formaldehyde, and up to about 25% by weight of the reaction product having a pH at least about 4.5 of propylene oxide with styrene-maleic acid copolymer.

13. A curable resinous composition which comprises a homogeneous compatible admixture of a water soluble condensation product of melamine and formaldehyde, and up to about 25% by weight of the reaction product having a pH at least about 4.5 of propylene oxide with polyacrylic acid.

14. A curable resinous composition which comprises a homogeneous compatible admixture of a water soluble condensation product of a urea-melamine mixture and formaldehyde, and up to about 25% by weight of the reaction product having a pH at least about 4.5 of propylene oxide with ethylene-maleic acid copolymer.

15. The method of making a curable liquid resinous composition which comprises the steps of forming (A) an aqueous condensation reaction mixture comprising (1) an aldehyde and (2) a compound selected from the group consisting of a phenol, urea, melamine, and a mixture of urea and melamine, heating the reaction mixture to initiate a condensation reaction therein, continuing the condensation reaction and homogeneously adding to (A) the reaction mixture at any time before said mixture becomes a permanently insoluble infusible mass up to about 25% by weight of (B) the reaction product having a pH at least about 4.5 of (1) an alkylene oxide having a structure represented by the formula:

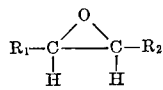

R₁ being selected from the group consisting of hydrogen atom, alkyl radical having up to twenty carbon atoms, aryl and alkylaryl radicals, R₂ being selected from the group consisting of hydrogen atom, halogen atom and alkoxy radical, with (2) a polycarboxylic synthetic polymer, said polymer being selected from the group consisting of styrene-maleic anhydride copolymer, styrene-maleic acid copolymer, an alkali metal salt of styrene-maleic acid copolymer, ethylene-maleic anhydride copolymer, ethylene-maleic acid copolymer, an alkali metal salt of ethylene-maleic acid copolymer, polyacrylic acid and polymethacrylic acid.

16. The method in accordance with claim 15 in which said (B) reaction product of an alkylene oxide with a polycarboxylic synthetic polymer is added to (A) the aqueous condensation reaction mixture before the step of heating said mixture to initiate a condensation reaction therein.

17. The method in accordance with claim 15 which includes the step of dehydrating the liquid resinous composition to a curable solid composition.

18. The method in accordance with claim 15 in which said (B) reaction product of an alkylene oxide with a polycarboxylic synthetic polymer is added to (A) the aqueous condensation reaction mixture before said mixture becomes hydrophobic.

19. The method in accordance with claim 15 which includes the steps of heating the liquid resinous composition and maintaining said heating until the liquid resinous composition cures into a permanently insoluble infusible solid.

References Cited by the Examiner

UNITED STATES PATENTS

| | | | |
|---|---|---|---|
| 2,469,408 | 5/1949 | Powers et al. | 260—43 |
| 2,607,761 | 8/1952 | Seymour | 260—78.5 |
| 2,725,308 | 11/1955 | Nickerson | 260—45.2 |
| 2,923,653 | 2/1960 | Matlin et al. | 260—851 |
| 2,961,424 | 11/1960 | Mueller et al. | 260—45.2 |
| 3,002,860 | 10/1961 | Bishop et al. | 260—45.5 |
| 3,030,332 | 4/1962 | Lombardi et al. | 260—43 |

OTHER REFERENCES

Calmon, "Ion Exchangers in Organic and Biochemistry," published by Interscience Publishers Inc., New York, N.Y., 1957, p. 126.

Seymour et al., "Copolymers of Vinyl Compounds and Maleic Anhydride, Ind. and Eng. Chem., vol. 41, No. 7, July 1949, pages 1509–1513.

JOSEPH L. SCHOFER, *Primary Examiner.*

DANIEL ARNOLD, LEON J. BERCOVITZ,
*Examiners.*

J. A. SEIDLECK, *Assistant Examiner.*